United States Patent [19]
Creigh et al.

[11] Patent Number: 5,956,348
[45] Date of Patent: Sep. 21, 1999

[54] METHOD AND APPARATUS FOR RECONSTRUCTING LAN FRAMES FOLLOWING TRANSFER THROUGH AN ASYNCHRONOUS TRANSFER MODE SYSTEM

[75] Inventors: John Lock Creigh, Raleigh; Francis E. Noel, Jr.; Lorrie A. Tomek, both of Durham, all of N.C.

[73] Assignee: International Business Machines Corporation, Armonk, N.Y.

[21] Appl. No.: 08/826,845

[22] Filed: Apr. 8, 1997

[51] Int. Cl.⁶ .................................. H04J 3/12; H04J 3/06
[52] U.S. Cl. ............................................. 370/528; 375/363
[58] Field of Search ..................................... 370/470, 471, 370/472, 473, 249, 229, 528, 350, 352, 516, 514, 504, 324, 503, 505, 509, 512, 520, 395, 389; 395/200.62, 200.05; 371/42, 47.1; 375/354, 363, 365

[56] References Cited

U.S. PATENT DOCUMENTS

| | | | |
|---|---|---|---|
| 5,355,366 | 10/1994 | Li et al. ................................... | 370/528 |
| 5,483,532 | 1/1996 | Eriksson .................................. | 370/528 |
| 5,570,362 | 10/1996 | Nishimura ............................... | 370/395 |
| 5,610,918 | 3/1997 | Kamo et al. ............................ | 370/395 |
| 5,613,069 | 3/1997 | Walker ................................ | 395/200.15 |
| 5,659,540 | 8/1997 | Chen et al. ............................. | 370/249 |
| 5,663,959 | 9/1997 | Nakagawa ............................... | 370/528 |
| 5,675,642 | 10/1997 | Sone ....................................... | 370/389 |
| 5,717,858 | 2/1998 | Shatayer et al. ........................ | 370/229 |

*Primary Examiner*—Huy D. Vu
*Assistant Examiner*—Chiho Andrew Lee
*Attorney, Agent, or Firm*—Gerald R. Woods

[57] ABSTRACT

Variable length LAN frames can be segmented into fixed length cells to allow the data in the frames to be transported through an intermediate cell-based system, such as an ATM network. Where transport through the intermediate system results in time gaps between data units extracted from the cells, special symbol combinations can be inserted into the time gaps to permit frame-representing data to be forwarded toward its destination as a "stretched frame" without waiting for all the cells representing the frame to arrive. When a stretched LAN frame is received at a "stretch-aware" LAN station, the special symbol combinations are detected and removed to recover at least the data payload of the original LAN frame.

6 Claims, 3 Drawing Sheets

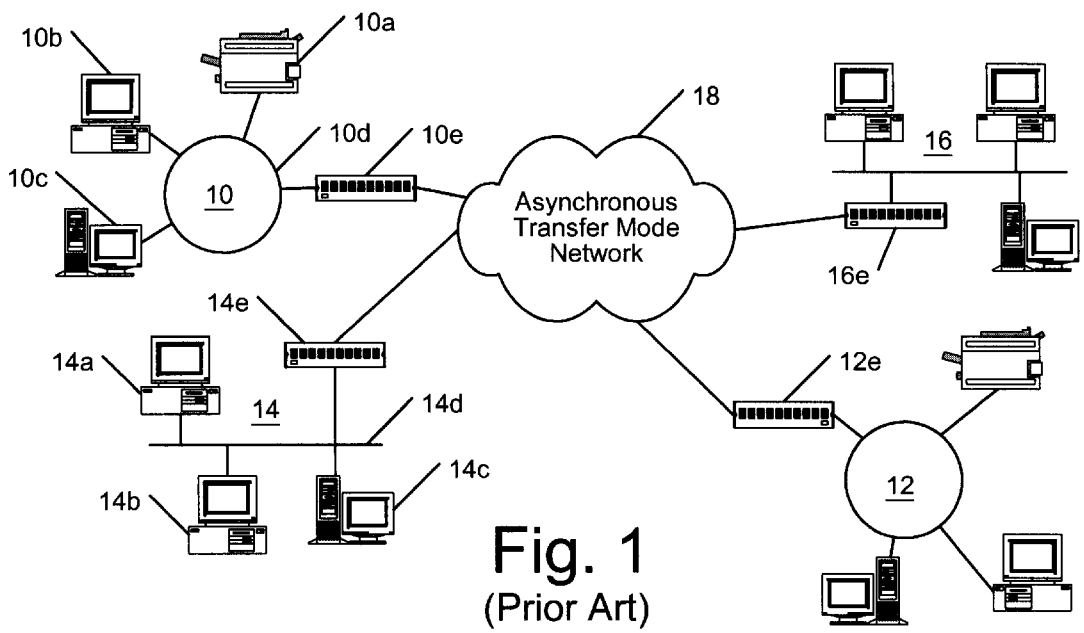
Fig. 1
(Prior Art)
Fig. 2
(Prior Art)
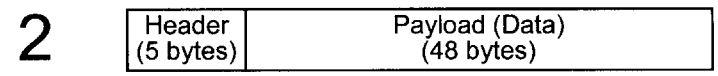
Fig. 3
(Prior Art)
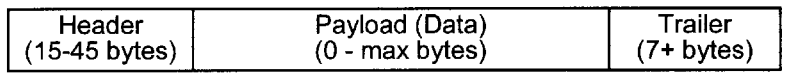
Fig. 4
(Prior Art)
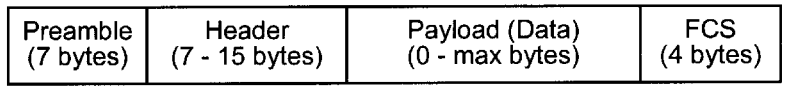

METHOD AND APPARATUS FOR RECONSTRUCTING LAN FRAMES FOLLOWING TRANSFER THROUGH AN ASYNCHRONOUS TRANSFER MODE SYSTEM

FIELD OF THE INVENTION

The present invention relates to data networks and more particularly to a method and apparatus for reconstructing a variable length LAN frame following the transfer of the frame in a series of fixed length cells through a cell-based system, such as an Asynchronous Transfer Mode system.

BACKGROUND OF THE INVENTION

In one well known type of data communications technology, user information is transported in variable length data units generally referred to as packets. Examples of products using variable length packets include Token Ring and Ethernet local area networks ( LANs) in which such packets are transferred between user stations over a transmission medium shared by all of the stations on the LAN. As implied by the name, LANs were developed primarily to connect user stations located within a limited geographic area, such as a campus, a single building or even a limited area within a single building.

There are good reasons why it is beneficial to have networking technology that allows two or more widely-separated users to interact as if they are directly attached to the same local LAN. One reason is that application programs originally written for execution only in a LAN environment need not be abandoned or have their usefulness impaired simply because all of the potential program users cannot be physically to the same LAN. If a remote program user can communicate with the LAN through an intermediate communications system, then that user can utilize the application program (or other LAN-attached resources) with the same ease as other users who actually are connected directly to the LAN. An intermediate system which supports transfer of LAN frames between remote users is said to provide LAN emulation support to the remote users.

The most widely known example of such an intermediate system is a wide area network or WAN. Because wide area networks typically serve a wide variety of users with differing data traffic requirements, WAN technology is typically a "general purpose" technology rather than being optimized for a single purpose. Asynchronous Transfer Mode or ATM technology is one such "general purpose" WAN technology that is finding increasing favor because of its high potential bandwidth and its ability to handle data traffic having considerably different service requirements and properties.

One of the fundamental requirements of ATM technology is that data be transported in fixed length data units commonly referred to as cells. The mandatory use of fixed length cells makes it possible to switch data at high speeds, using special hardware-based switches, along paths through a wide area network.

Current ATM standards define a fifty three byte cell divided into a five byte header field and a forty-eight byte data or payload field. LAN frames are typically considerably longer than fifty-three bytes. Thus, before a LAN frame can be transported through an ATM network, it is normally necessary to segment or disassemble that frame into shorter units of data, each of which can be accommodated within a standard ATM cell. At the destination, data extracted from the ATM cells can be reassembled to recover the original LAN frame.

In an ideal world, ATM cells representing successive "slices" of a LAN frame arrive at a destination in the right order and without any inter-cell gaps, allowing the LAN frame to be reconstructed "on the fly" as it is forwarded to the intended user. This is, of course, not an ideal world. For several reasons, it is entirely possible for ATM cells representing successive bytes in a LAN frame, to be delayed in transit relative to one another resulting in inter-cell time gaps at the destination.

To make use of a LAN frame at its destination, that frame clearly must be complete. One known technique for reconstructing a complete LAN frame is to temporarily store or buffer data extracted from ATM cells until every ATM cell representing the frame has been received and processed at the destination. After the complete LAN frame is stored, then the buffer contents are forwarded to the intended user.

A drawback of this prior art approach is that the delivery of each frame is held up until the last ATM cell containing frame data is received and processed without regard to whether or not any of the ATM cells was actually delayed in transit. Thus, every LAN frame is held up at its destination to deal with the uncertain possibility that an ATM cell or cells carrying data for any of the frames might have been delayed in transit.

SUMMARY OF THE INVENTION

The present invention is a technique for processing frame-representing data units received from a cell-based system to create a "stretched" frame in which any interunit time gaps are filled by special symbols which can be removed at the frame's destination to recover the original frame data.

The invention is intended to be used in a system in which source and destination systems send and receive data in variable length frames while an intermediate system transports data in fixed length cells. Each frame is broken down or segmented into a series of cells for transport through the intermediate system. When data units are extracted from cells received from the intermediate system, inter-unit time gaps may exist. If such time gaps are detected, special symbols are used to fill the gaps, creating a stretched frame which is forwarded to the destination even before the last of the data units for the frame is received. The special symbols can be removed at the destination system to reconstruct the original frame data.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 1 is a representation of a network environment in which the present invention can be used;

FIG. 2 shows the format of a standard, fixed-length Asynchronous Transfer Mode or ATM cell;

FIG. 3 shows the format of a standard, variable-length Token Ring frame;

FIG. 4 shows the format of a standard, variable-length Ethernet frame;

DETAILED DESCRIPTION

Figure 5:
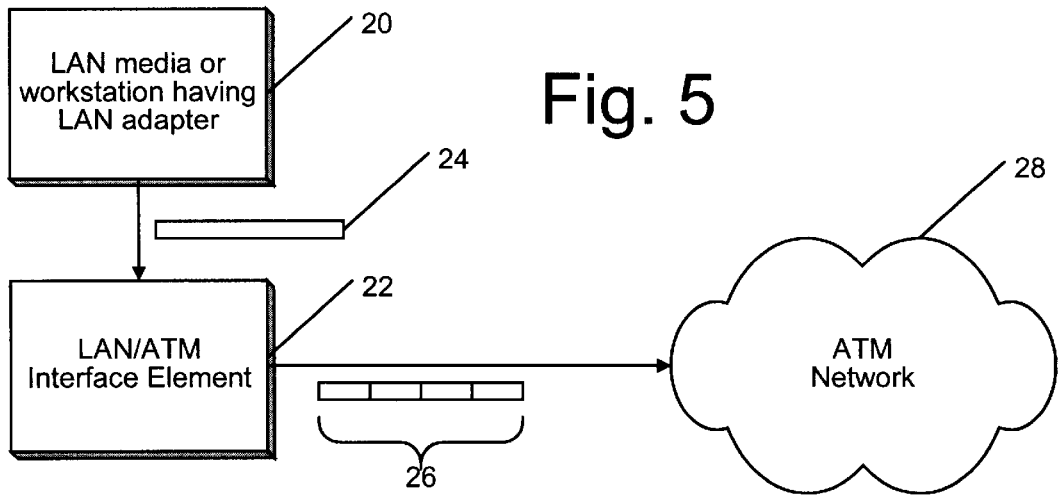
FIG. 5 is a representation of data processing steps which occur at the logical interface between a LAN system and a cell-based system, the latter being represented as an ATM network.

FIG. 1 is a representation of a typical data communications network in which individual workstations and other devices can communicate with each other locally over direct connections to shared or switched media or remotely through an interposed wide area network. Two ring communication networks 10 and 12 are illustrated. In a ring communication network, well known examples of which are Token Ring and FDDI networks, individual stations are attached in a logical ring. For example, in network 10, stations 10a, 10b and 10c are attached to a transmission medium 10d in a ring configuration. For stations on the same ring, data is transferred around the ring through successively attached stations until the data returns to the originating station, where it is stripped or removed from the ring. In the references to network 10 and elsewhere in this description, the term "station" is used generically to represent any kind of device which works on the network, including personal computers, print servers, file servers, and the like.

Two shared bus networks 14 and 16 are also illustrated. In a shared bus network, the most common example of which is an Ethernet network, the stations attach directly to a common shared bus. For example, in network 14, stations 14a, 14b, and 14c are attached to a single shared bus 14d. In an Ethernet network, a station sends data to another station in the same network by broadcasting the data over the shared bus. All stations receive the broadcast but only the station for which the data is intended actually processes the data.

Local area networks can operate on a stand-alone basis so that any station in the LAN can communicate only with other stations on the same LAN. For a LAN station to communicate with another station not directly attached to the same local LAN, the two LANs must be linked through an intermediate system. To make this possible, each LAN includes at least one interface element capable of supporting data transfers between the LAN and the intermediate system. In FIG. 1, networks 10, 12, 14 and 16 include interface units 10e, 12e, 14e and 16e, respectively. Each interface unit may be a free-standing device as shown in the drawing or, alternatively, may take the form of an adapter card actually installed in a device or workstation directly connected to the local LAN. In the remainder of this description, the interface unit is described as a LAN/ATM interface element to reflect that the intermediate system will be assumed to be an ATM network and the interface unit may either be a free-standing device or an integrated adapter.

The fact that the intermediate system is described hereafter as an ATM wide area network should not be interpreted as limiting the use of the present invention to such an environment. The present invention can be used in any environment in which two LAN devices or networks are connected through an intermediate cell-based system. Cell-based systems can include wide area networks, LAN systems using fixed length cells to transport data or even ATM switch devices.

For purposes of the present invention, the only LAN/ATM interface function that needs to be described is a protocol conversion function that must be performed in order to be sure that data transferred across the interface conforms to a format that is usable by stations on the receiving side of the interface.

In an ATM network, data is transported in relatively-short fixed length cells having the general format shown in FIG. 2. A standard ATM cell has a five byte header section followed by a forty-eight byte payload or data section. The header is divided into a number of different fields, each of which contains specific information relevant to such properties as cell type, cell routing, network congestion and others. The payload section is used to carry actual user source data.

In local area networks, on the other hand, data is transported in variable length frames which may typically be much longer than the fifty-three byte length of a standard ATM cell. Referring to FIG. 3, a standard Token Ring network frame has a header section which is fifteen to forty-five bytes long, a payload section which is from zero to approximately nineteen thousand bytes long and a trailer section which at least seven bytes long. Referring to FIG. 4, a standard Ethernet network frame has a seven byte preamble section, a seven to fifteen byte header section, a payload section of zero to approximately fifteen hundred bytes and a four byte FCS (Frame Check Sequence) trailer section.

If the contents of a variable length frame originating in a LAN are to be transported across an ATM network, a LAN/ATM interface element must clearly be capable of segmenting the frame contents into multiple data units which can written into a series of ATM cells. This segmentation process is illustrated in FIG. 5 where block 20 represents a LAN system. The term LAN system generically represents any device or component which provides data in variable length frames, represented by a single block 24, conforming to a particular set of LAN standards. Each frame to be transported across a wide area network must be presented to a LAN/ATM interface element 22, which divides or segments the frame into a train 26 consisting of one or more consecutive cells. Most of the frame contents are written into the payload sections of the cells although some frame header information, such as destination addresses, may be reflected in the cell headers. The details of the conversion process are well known but are not important to an understanding of the present invention and will not be discussed.

The generated cell train 26 is injected into ATM network 28 which must provide routing and transport services not only for train 26 but also for many other cell trains generated independently and concurrently by many other data sources. Cell-based systems, such as ATM network 28, are typically complex systems including many switching points or nodes for switching independently-generated traffic from a large number of sources to a large number of destinations over great distances. It cannot be assumed that a cell-based system, such as a wide area network, is capable of operating synchronously; that is, capable of switching all data using a single master clock. Local clock signals may be used in different parts of the network, introducing time shifts or jitter to cell transfers. Also, in many systems, data can be assigned different priority levels causing high priority data to be given preferential treatment relative to low priority data. Thus, the transfer of two successive low priority cells can be interrupted to accommodate the transfer of newly-arrived higher priority cells.

Figure 6:
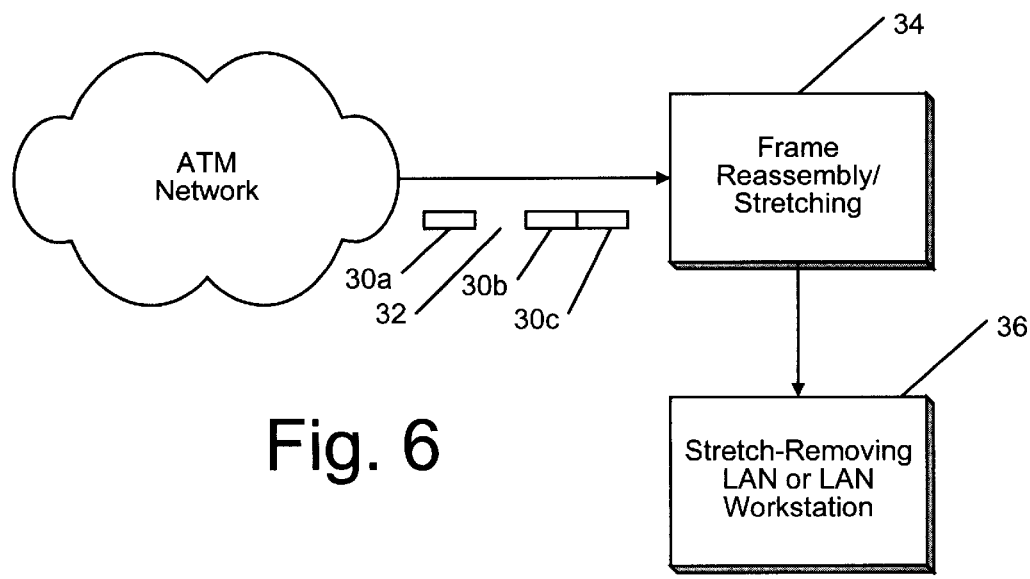
FIG. 6 is a representation of data steps that are performed to create a "stretched" frame when time gaps exist in data units extracted from cells received from a cell-based system.

As a consequence of these characteristics, there is no guarantee that cells which enter the network in a single continuous train, such as train 26, will leave the network the same way. Referring to FIG. 6, it is much more likely that cells that were originally contiguous, such as cells 30a, 30b and 30c, will in fact be separated by one or more time gaps, such as gap 32.

As noted earlier, one way to deal with inter-cell gaps is to temporarily store data extracted from received cells until every cell representing a frame has been received. The complete frame is then reconstructed using the stored data before the frame is released toward its final LAN destination. Also as noted earlier, the disadvantage of this store and forward mode of operation is that the release of every frame is delayed regardless whether or not any inter-cell gaps were ever created during transmission across the wide area network.

The present invention permits a frame to be released toward its final destination once sufficient routing information has been received from the wide area network. A frame recovery/stretching system 34 detects time gaps between data units extracted from successive cells in a train and inserts special "stretch" symbols into those gaps to create a stretched LAN frame. When such a frame is received at a "stretch-aware" LAN element or workstation 36, logical operations are performed there to remove the stretch symbols, thereby reconstructing the LAN frame.

Figure 7:
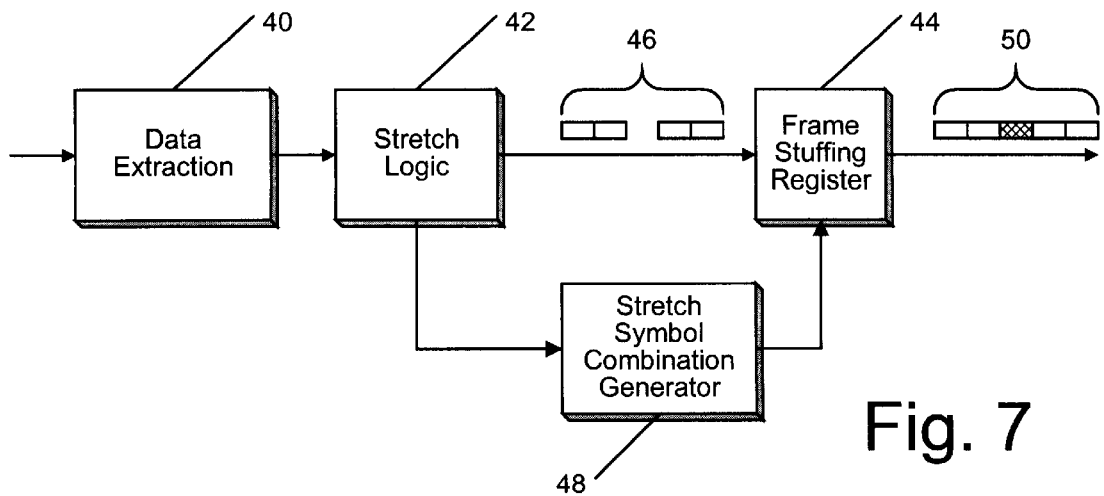
FIG. 7 is a block diagram of the logic elements that are used to create the stretched frame.

FIG. 7 is a representation of the logical components used to generate a stretched LAN frame beginning with data units extracted from arriving ATM cells. Cells are received and processed in data extraction circuit 40 which performs the function of extracting frame data from successive cells and forwarding extracted frame data in units to a stretch logic circuit 42. Circuit 42 detects the start and end of each successive data unit and the type of data (header, trailer, or payload) included in the data unit. The stretch logic circuit forwards the data units, represented as a series 46 of data units separated by a single time gap, to a frame stuffing register 44 and also generates stretch control signals which are sent to a stretch symbol generator 48 capable of producing stretch symbols which can inserted into the data stream in the frame stuffing register 44. Detailed information about these signals and the logical conditions under which they are generated is provided below. The output 50 of the frame stuffing register is a continuous data stream made up of frame data extracted from ATM cells possibly separated by one or more sets of stretch symbols produced by symbol generator 48.

Figure 8:
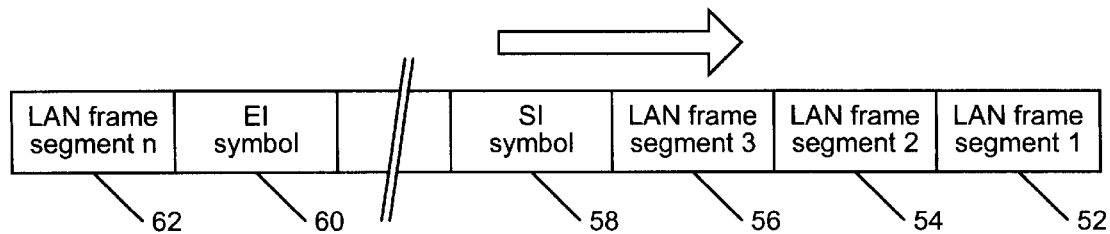
FIG. 8 is a detailed representation of a typical stretched frame.

FIG. 8 is a more detailed representation of the elements of a stretched LAN frame. The stretched frame shown there begins with three successive LAN frame segments 52, 54 and 56, between which no time gaps exist. It is assumed that a time gap was detected following segment 56, causing the stretch symbol generator to generate and "stuff" a Start-Ignore (SI) stretch symbol 58 into the frame. When the end of the time gap is detected by stretch logic circuit 42, an End-ignore (EI) stretch symbol 60 is generated and stuffed into the frame before the start of the next LAN frame segment 62.

As implied by their names, the SI and EI stretch symbols are intended to be interpreted by a station receiving the stretched frame as meaning that the station should ignore the SI and EI symbols and anything in the stretched frame between those two symbols. Although not specifically shown in FIG. 8, the SI and EI symbols might be bridged by a Null stretch symbol, which could also be employed alone to bridge short time gaps.

The exact format of the stretch symbols (Start-Ignore, End-Ignore and Null) will depend on the LAN protocols being implemented. Possible formats for the symbols for Token Ring and Ethernet Media Access Control/Physical (MAC/PHY) standards are described below.

When using differential Manchester encoding, each bit time is divided into two halves, either of which can encoded as a "1" or as "0". There are four possible bit time combinations, namely "11", "10", "01" and "00". Each of the four possible bit combinations represents one of four possible Manchester symbols 0, 1, J and K.

The Token Ring standard supports transmission of 0's and 1's or any of the following combinations of the four Manchester symbols 0,1,J,K:

| | |
|---|---|
| JK0JK000 | representing a start delimiter; |
| JK1JKK11E | representing an end delimiter; and |
| JK0JK000/JK1JK11E | representing "abort". |

To create stretch symbols where differential Manchester encoding is used, three new symbol combinations are proposed:

| | |
|---|---|
| K0K1 | representing a "Start-Ignore" stretch symbol; |
| KK00 | representing an "End-Ignore" stretch symbol; and |
| K0K0 | representing "null". |

Any stretch symbols that are chosen must, of course, be unique and therefore recognizable by symbol detector logic. Further, the stretch symbols must be DC-balanced and must have properties which will not cause changes in jitter characteristics in a Token Ring in which they are used. The above three symbols meet these criteria.

Figure 9:
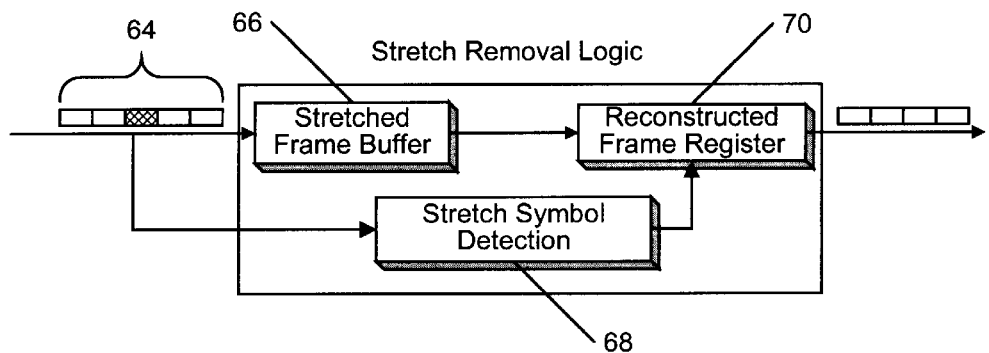
FIG. 9 is a block diagram of the logic elements are used to reconstruct an original frame from a stretched frame.

FIG. 9 illustrates the logical elements required to process a stretched LAN frame at its destination in order to recover the original LAN frame. These logical elements would exist in a "stretch-aware" LAN station or LAN adapter. Each LAN frame 64, whether known to be stretched or not, is received into a frame buffer 66 and simultaneously into a stretch symbol detector element 68. The detector 68 detects any stretch symbols in the stretched frame and allows only frame data units to be written into a frame register 70.

The output of the frame register should be a reconstruction of at least the data payload of the original frame. As is well known to those skilled in local area network, the output of the frame register may not be identical to the original frame since standard routing protocols may result in changes in certain fields in the frame header.

While FIG. 9 suggests that a reconstructed frame is actually transferred from the station in which the reconstruction occurs, the reconstructing station is usually the ultimate destination for the frame. Consequently, the frame data is more likely to forwarded to an application program in the station than to be physically transferred from the station. In some situations, however, the frame might be recovered before reaching the final destination. As an example, where congestion is encountered in a network, an intermediate communications device might begin to operate in a "store and forward" mode of operation. In a "store and forward" mode, the entire LAN frame might be recovered and stored in the device before the frame is passed on toward the destination.

As noted several times, stretch symbols are not removed from a stretched LAN frame until the frame either reaches its final destination or a LAN adapter serving that destination. To avoid distorting or changing the control information for the frame, all of which are contained in the header or trailer sections of the original LAN frame, stretch symbols are confined to the payload or data sections of the frame.

While there has been described what is considered to be a preferred embodiment of the invention, variations and modifications in that embodiment will occur to those skilled in the art once they are made aware of the invention. Therefore, it is intended that the appended claims shall be construed to include both the preferred embodiment and all such variations and modifications as fall within the true spirit and scope of the invention.

What is claimed is:

1. For use in a system wherein source and destination systems send and receive data in variable length frames and wherein an intermediate system connecting the source and destination systems transports data in fixed length cells, each of the variable length frames being segmented into a sequence of one or more fixed length cells for transport through the intermediate system, a method of processing cells received from the intermediate system comprising the steps of:

extracting a data unit from each cell representing a portion of a frame in transit to a particular destination system;

detecting any time gaps which exist between data units representing successive segments of the frame;

where a time gap is detected, inserting one or more special symbol combinations into the time gap to create a stretched frame, said special symbol combinations being removable at the destination system.

2. A method as set forth in claim 1 wherein the special symbol combinations are inserted at the same data rate at which cell data symbols are received to form a continuous data stream comprising either cell data symbols or special symbol combinations.

3. For use in a system wherein source and destination systems send and receive data in variable length frames and wherein an intermediate system connecting the source and destination systems transports data in fixed length cells, each of the original variable length frames being segmented into a sequence of one or more fixed length cells for transport through the intermediate system and wherein a destination system may receive a stretched frame comprising a plurality of data unit symbols separated by special symbol combinations previously inserted to fill inter-unit time gaps, said data unit symbols being extracted from the fixed length cells, a method of reconstructing an original variable length frame comprising the steps of:

writing each symbol in the stretched frame into a data buffer;

concurrently analyzing the symbols in the stretched frame to identify any previously inserted special symbol combinations; and replacing any detected special symbol combinations with data unit symbols extracted from the fixed length cell following the detected special symbol combinations whereby successive data buffer positions will contain only data unit symbols extracted from successive fixed length cells.

4. For use in a system wherein source and destination systems send and receive data in variable length frames and wherein an intermediate system connecting the source and destination systems transports data in fixed length cells, each of the variable length frames being segmented into a sequence of one or more fixed length cells for transport through the intermediate system, a method of processing cells received from the intermediate system comprising the steps of:

extracting a data unit from each cell, each data unit containing data for a segment of a frame being transported;

detecting any time gaps which exist between successive data units;

inserting special symbol combinations to fill any detected time gaps, said special symbol combinations being removable at the destination system to reconstruct the frame.

5. A method as set forth in claim 4 wherein the special symbol combination comprises a null symbol.

6. For use in a system wherein source and destination systems send and receive data in variable length frames and wherein an intermediate system connecting the source and destination systems transports data in fixed length cells, each of the variable length frames being segmented into a sequence of one or more fixed length cells for transport through the intermediate system, a method of processing cells received from the intermediate system comprising the steps of:

extracting a data unit from each cell representing a portion of a frame in transit to a particular destination system;

detecting any time gaps which exist between successive data units;

where the beginning of a time gap is detected, inserting a start-ignore symbol combination followed by one or more symbols; and where the end of a time gap is detected, inserting an end-ignore symbol combination, said start-ignore symbol combination, said end-ignore symbol combination and any intervening symbols being removable at the destination system to reconstruct the frame.

* * * * *